US012236865B2

(12) United States Patent
Liu et al.

(10) Patent No.: US 12,236,865 B2
(45) Date of Patent: Feb. 25, 2025

(54) METHOD OF DRIVING DISPLAY DEVICE, INCLUDING CHARGE MAINTENANCE STAGE

(71) Applicants: Chengdu BOE Optoelectronics Technology Co., Ltd., Sichuan (CN); BOE TECHNOLOGY GROUP CO., LTD., Beijing (CN)

(72) Inventors: Guo Liu, Beijing (CN); Ziyang Yu, Beijing (CN); Maoying Liao, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 17/775,964

(22) PCT Filed: Jun. 17, 2021

(86) PCT No.: PCT/CN2021/100618
§ 371 (c)(1),
(2) Date: May 11, 2022

(87) PCT Pub. No.: WO2022/022146
PCT Pub. Date: Feb. 3, 2022

(65) Prior Publication Data
US 2022/0383816 A1 Dec. 1, 2022

(30) Foreign Application Priority Data
Jul. 29, 2020 (CN) ........................ 202010744381.X

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0426* (2013.01);
(Continued)

(58) Field of Classification Search
CPC ............... G09G 3/3233; G09G 3/3291; G09G 2300/0426; G09G 2300/0842;
(Continued)

(56) References Cited

U.S. PATENT DOCUMENTS

2006/0066254 A1 3/2006 Sasaki et al.
2014/0049531 A1* 2/2014 Kwak .................... G09G 1/005 345/211
2017/0047002 A1* 2/2017 Xuan .................. G09G 3/3233

FOREIGN PATENT DOCUMENTS

CN 103594052 A 2/2014
CN 103700338 A 4/2014
(Continued)

OTHER PUBLICATIONS

China Patent Office, CN202010744381.X First Office Action issued on Mar. 23, 2021.
(Continued)

*Primary Examiner* — David D Davis
(74) *Attorney, Agent, or Firm* — HOUTTEMAN LAW LLC

(57) ABSTRACT

A method of driving a display device, where the display device includes a display substrate including a plurality of rows of pixel circuits, and in each pixel circuit, a reset compensation circuit and a data writing circuit are connected at a second node, and the reset compensation circuit is connected to a reset control signal line and a first voltage input terminal; in a driving stage, driving a light emitting device OLED connected to each of other rows of pixel circuits except a last row of pixel circuits further includes a charge maintenance stage performed after a light emission voltage generation stage; and in the stable display stage, all light emitting devices OLED simultaneously emit light; where in the charge maintenance stage, the first voltage input terminal is disconnected from the second node by the reset compensation circuit in response to control of a reset control signal.

6 Claims, 6 Drawing Sheets

(52) U.S. Cl.
CPC ............... *G09G 2300/0842* (2013.01); *G09G 2310/061* (2013.01); *G09G 2320/0233* (2013.01)

(58) Field of Classification Search
CPC ..... G09G 2310/061; G09G 2320/0233; G09G 2320/045; G09G 3/3258; G09G 3/3241
See application file for complete search history.

(56) References Cited

FOREIGN PATENT DOCUMENTS

| | | | |
|---|---|---|---|
| CN | 103971640 | A | 8/2014 |
| CN | 106652904 | A | 5/2017 |
| CN | 110867160 | A | 3/2020 |
| CN | 111754941 | A | 10/2020 |
| KR | 20200059836 | A | 5/2020 |

OTHER PUBLICATIONS

China Patent Office, CN202010744381.X First Office Action issued on Sep. 3, 2021.

* cited by examiner

METHOD OF DRIVING DISPLAY DEVICE, INCLUDING CHARGE MAINTENANCE STAGE

TECHNICAL FIELD

The present disclosure relates to the display field, and in particular, to a pixel circuit, a driving method thereof, a display substrate, and a display device.

BACKGROUND

Active Matrix Organic Light Emitting Diode (AMOLED) panels are applied more and more widely. A pixel display device in an AMOLED panel is an Organic Light-Emitting Diode (OLED), and the AMOLED panel can emit light through an OLED which is driven to emit light by a driving current generated by a driving transistor in a saturated state.

In an existing low-temperature polysilicon processe, uniformity of threshold voltages of all driving transistors on a display substrate is poor, and shift of the threshold voltages occurs during use of the display substrate. When scanning lines control the driving transistors to be turned on to input a same data voltage to the driving transistors, different driving currents are generated due to different threshold voltages of the driving transistors, resulting in poor brightness uniformity of OLEDs in a display device.

SUMMARY

To solve at least one of the technical problems in the related art, the present disclosure provides a pixel circuit, a driving method thereof, a display substrate, and a display device.

In a first aspect, embodiments of the present disclosure provide a pixel circuit, including: a data writing circuit, a reset compensation circuit, a light emission control circuit and a driving transistor, the reset compensation circuit and a gate of the driving transistor are connected at a first node, the reset compensation circuit and the data writing circuit are connected at a second node, and the reset compensation circuit, a second electrode of the driving transistor and the light emission control circuit are connected at a third node. The data writing circuit is connected to a gate line and a data line, and is configured to write a data voltage provided by the data line to the second node in response to control of a gate driving signal provided by the gate line. The light emission control circuit is connected to a light emission control signal line and a first electrode of a light emitting device, and is configured to control connection and disconnection between the third node and the first electrode of the light emitting device in response to control of a light emission control signal provided by the light emission control signal line. The reset compensation circuit is connected to the gate line, a reset control signal line and a first voltage input terminal, and is configured to connect the first node to the third node in response to control of the gate driving signal provided by the gate line, write a voltage at the first electrode of the light emitting device to the first node when the third node is connected to the first electrode of the light emitting device to reset the first node, acquire a threshold voltage of the driving transistor when the third node is disconnected from the first electrode of the light emitting device, write a first voltage provided by the first voltage input terminal to the second node in response to control of a reset control signal provided by the reset control signal line, and write, according to a change of a voltage at the second node and the threshold voltage, a light emission voltage capable of performing threshold compensation on the driving transistor to the first node. A first electrode of the driving transistor is connected to the first voltage input terminal, and the driving transistor is configured to generate, according to the light emission voltage, a driving current capable of driving the light emitting device to emit light.

In some embodiments, the light emission voltage satisfies:

$$V0=2*V1+Vth-\text{Vdata}$$

where V0 is the light emission voltage, V1 is the first voltage, Vth is the threshold voltage of the driving transistor, and Vdata is the data voltage.

In some embodiments, the data writing circuit includes: a first transistor. A control electrode of the first transistor is connected to the gate line, a first electrode of the first transistor is connected to the data line, and a second electrode of the first transistor is connected to the second node.

In some embodiments, the reset compensation circuit includes: a second transistor, a third transistor, and a capacitor. A control electrode of the second transistor is connected to the gate line, a first electrode of the second transistor is connected to the first node, and a second electrode of the second transistor is connected to the third node. A control electrode of the third transistor is connected to the reset control signal line, a first electrode of the third transistor is connected to the second node, and a second electrode of the third transistor is connected to the first voltage input terminal. A first terminal of the capacitor is connected to the second node, and a second terminal of the capacitor is connected to the first node.

In some embodiments, the light emission control circuit includes: a fourth transistor; and a control electrode of the fourth transistor is connected to the light emission control signal line, a first electrode of the fourth transistor is connected to the third node, and a second electrode of the fourth transistor is connected to the first electrode of the light emitting device.

In some embodiments, all transistors in the pixel circuit are P-type transistors.

In a second aspect, the embodiments of the present disclosure provide a display substrate, including: the pixel circuit provided in the above first aspect.

In a third aspect, the embodiments of the present disclosure provide a display device, including: the display substrate provided in the above second aspect.

In a fourth aspect, the embodiments of the present disclosure provide a pixel driving method, the pixel driving method is based on the pixel circuit provided in the above first aspect. In a reset stage, the third node is connected to the first electrode of the light emitting device by the light emission control circuit in response to control of the light emission control signal, the first node is connected to the third node by the reset compensation circuit in response to control of the gate driving signal, and the voltage at the first electrode of the light emitting device is written to the first node through the third node to reset the first node. In a compensation stage, the third node is disconnected from the first electrode of the light emitting device by the light emission control circuit in response to control of the light emission control signal, the data voltage is written to the second node by the data writing circuit in response to control of the gate driving signal, the first node is connected to the third node by the reset compensation circuit in response to control of the gate driving signal, and the first node is charged by the first voltage input terminal through the driving transistor and the third node to acquire the threshold voltage of the driving transistor. In a light emission voltage generation stage, the first voltage is written to the second node in response to control of the reset control signal, and the light emission voltage capable of performing threshold compensation on the driving transistor is written, according to the change of the voltage at the second node and the threshold voltage, to the first node by the reset compensation circuit. In a light emission stage, a corresponding driving current is generated by the driving transistor according to the light emission voltage, and the third node is connected to the first electrode of the light emitting device by the light emission control circuit in response to control of the light emission control signal to provide the driving current for the light emitting device.

In some embodiments, between the light emission voltage generation stage and the light emission stage, the pixel driving method further includes:

in a charge maintenance stage, disconnecting the first voltage input terminal from the second node by the reset compensation circuit in response to control of the reset control signal.

DETAIL DESCRIPTION OF EMBODIMENTS

In order to enable those skilled in the art to better understand the technical solutions of the present disclosure, a pixel circuit, a driving method thereof, a display substrate, and a display device provided by the present disclosure are described in detail below with reference to the accompanying drawings.

Figure 1:
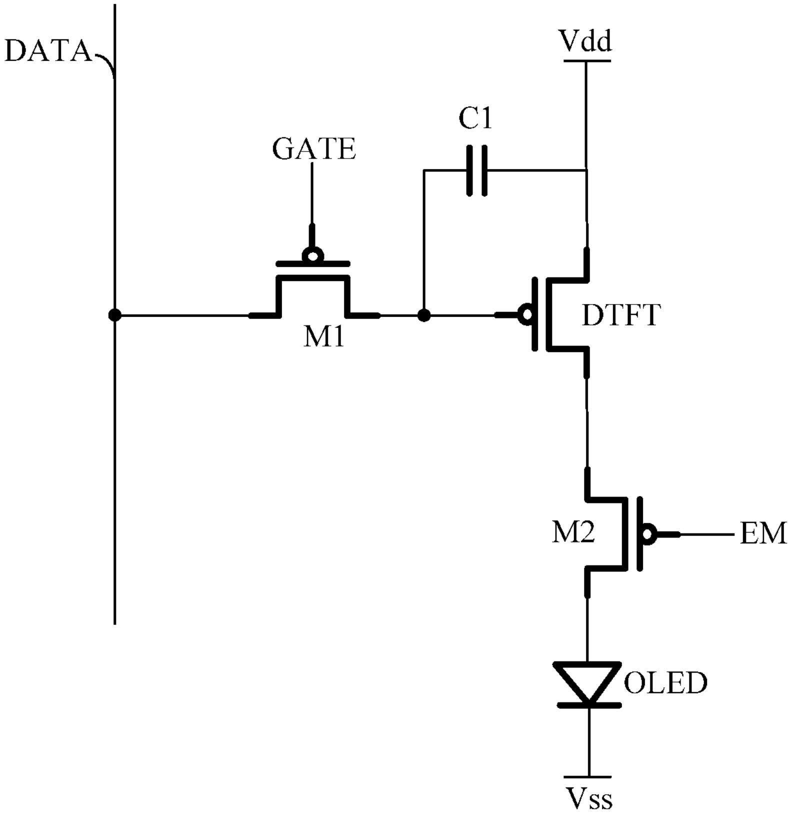
FIG. 1 is a schematic diagram of a circuit structure of a pixel circuit in the related art.

FIG. 1 is a schematic diagram of a circuit structure of a pixel circuit in the related art. As shown in FIG. 1, the pixel circuit (also referred to as a 3T1C circuit) shown in FIG. 1 includes 3 thin film transistors DTFT, M1 and M2, and 1 capacitor C1. Since the 3T1C circuit does not have a function of compensating for a threshold voltage of a driving transistor, a display device adopting the 3T1C circuit has a problem of obvious non-uniformity of OLED brightness.

Figure 2:
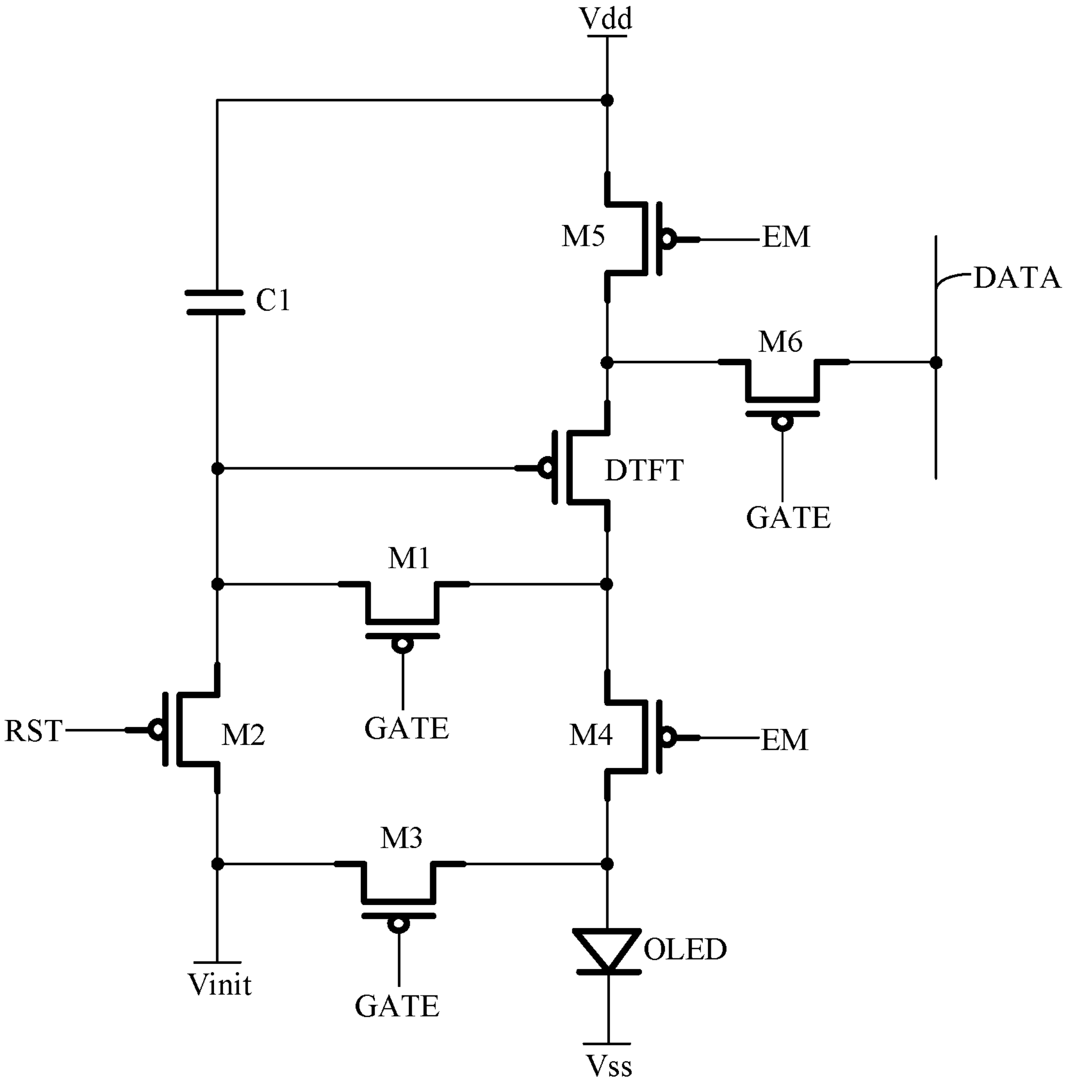
FIG. 2 is a schematic diagram of another circuit structure of a pixel circuit in the related art.

FIG. 2 is a schematic diagram of another circuit structure of a pixel circuit in the related art. As shown in FIG. 2, the pixel circuit (also referred to as a 7T1C circuit) shown in FIG. 2 includes 7 thin film transistors DTFT, M1 to M6, and 1 capacitor C1. The 7T1C circuit has a function of performing internal compensation for a threshold voltage of a driving transistor, thereby improving uniformity of OLED brightness in a display device to a certain extent. However, due to a fact that a large number of thin film transistors are disposed in the 7T1C circuit, each pixel circuit needs a relatively large occupied space when a layout is designed, so that the 7T1C circuit cannot be applied to some high-PPI (Pixels Per Inch) display devices.

In view of at least one of the technical problems in the related art, the present disclosure provides corresponding solutions, which will be described in detail below with reference to specific embodiments.

In the present disclosure, a light emitting device may be a current-driven light emitting device such as a Light Emitting Diode (LED) or an OLED in the related art, and the OLED is taken as an example of the light emitting device in the following embodiments.

A transistor may be independently selected from one of a polycrystalline silicon thin film transistor, an amorphous silicon thin film transistor, an oxide thin film transistor and an organic thin film transistor. A "control electrode" specifically refers to a gate of a transistor, a "first electrode" specifically refers to a source of the transistor, and a "second electrode" specifically refers to a drain of the transistor. Of course, it should be known by those skilled in the art that the "first electrode" and the "second electrode" are interchangeable with each other, that is, the "first electrode" may specifically refer to the drain of the transistor, and the "second electrode" may specifically refer to the source of the transistor.

In addition, transistors can be classified into N-type transistors and P-type transistors according to their semiconductor characteristics. When a transistor is used as a switching transistor, an N-type switching transistor is turned on under the control of a high-level control signal and is turned off under the control of a low-level control signal; and a P-type switching transistor is turned on under the control of a low-level control signal and is turned off under the control of a high-level control signal. The following embodiments are illustrated by taking a case where all transistors in a pixel circuit are P-type transistors as an example.

Figure 3:
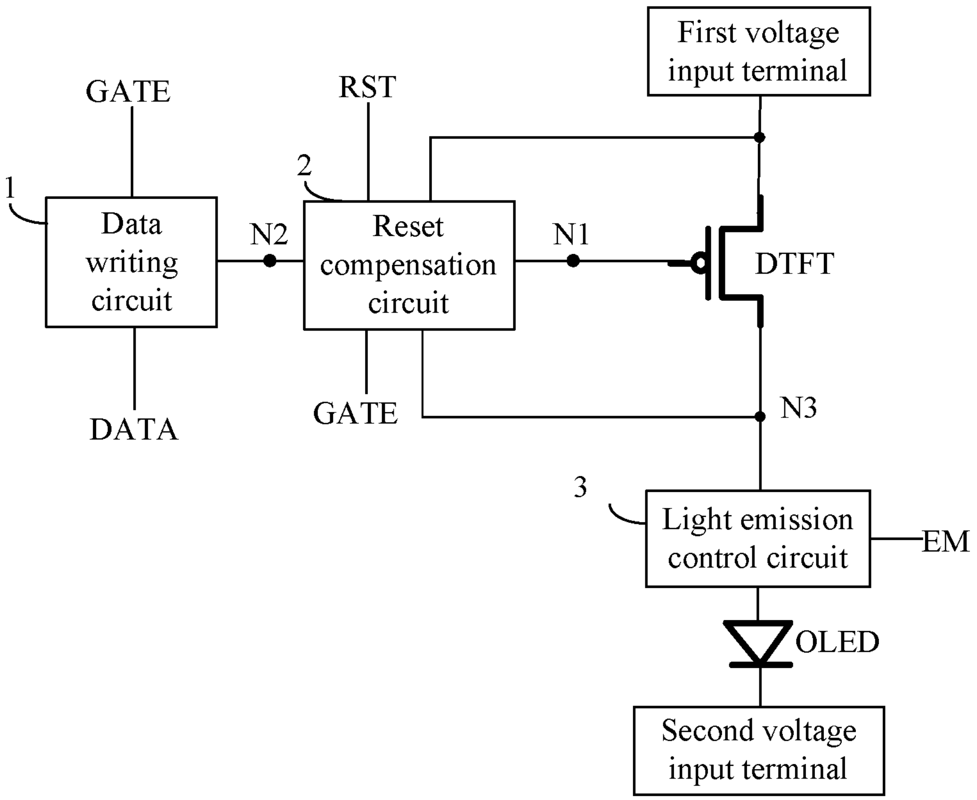
FIG. 3 is a schematic diagram of a circuit structure of a pixel circuit according to embodiments of the present disclosure.

FIG. 3 is a schematic diagram of a circuit structure of a pixel circuit according to the embodiments of the present disclosure. As shown in FIG. 3, the pixel circuit includes: a data writing circuit 1, a reset compensation circuit 2, a light emission control circuit 3 and a driving transistor DTFT, the reset compensation circuit 2 and a gate of the driving transistor DTFT are connected at a first node N1, the reset compensation circuit 2 and the data writing circuit 1 are connected at a second node N2, and the reset compensation circuit 2 and a second electrode of the driving transistor DTFT are connected at a third node N3.

The data writing circuit 1 is connected to a gate line GATE and a data line DATA, and is configured to write a data voltage provided by the data line DATA to the second node N2 in response to control of a gate driving signal provided by the gate line GATE.

The light emission control circuit 3 is connected to a light emission control signal line EM and a first electrode of a light emitting device OLED, and is configured to control connection and disconnection between the third node N3 and the first electrode of the light emitting device OLED in response to control of a light emission control signal provided by the light emission control signal line EM.

The reset compensation circuit 2 is connected to the gate line GATE, a reset control signal line RST and a first voltage input terminal, and is configured to connect the first node N1 to the third node N3 in response to control of the gate driving signal provided by the gate line GATE, write a voltage at the first electrode of the light emitting device OLED to the first node N1 when the third node N3 is connected to the first electrode of the light emitting device OLED to reset the first node N1, and acquire a threshold voltage of the driving transistor DTFT when the third node N3 is disconnected from the first electrode of the light emitting device OLED; and the reset compensation circuit 2 is further configured to write a first voltage provided by the first voltage input terminal to the second node N2 in response to control of a reset control signal provided by the reset control signal line RST, and write, according to a change of a voltage at the second node N2 and the threshold voltage, a light emission voltage capable of performing threshold compensation on the driving transistor DTFT to the first node N1.

A first electrode of the driving transistor DTFT is connected to the first voltage input terminal, and the driving transistor DTFT is configured to generate, according to the light emission voltage, a driving current capable of driving the light emitting device OLED to emit light.

An operating process of the pixel circuit provided by the embodiments of the present disclosure includes the following stages.

In a reset stage, the light emission control circuit 3 connects the third node N3 to the first electrode of the light emitting device OLED in response to the control of the light emission control signal, the reset compensation circuit 2 connects the first node N1 to the third node N3 in response to the control of the gate driving signal, and the voltage at the first electrode of the light emitting device OLED is written to the first node N1 through the third node N3 to reset the first node N1.

In a compensation stage, the light emission control circuit 3 disconnects the third node N3 from the first electrode of the light emitting device OLED in response to the control of the light emission control signal, the data writing circuit 1 writes the data voltage to the second node N2 in response to the control of the gate driving signal, the reset compensation circuit 2 connects the first node N1 to the third node N3 in response to the control of the gate driving signal, and the first voltage input terminal charges the first node N1 through the driving transistor DTFT and the third node N3 to acquire the threshold voltage of the driving transistor DTFT.

In a light emission voltage generation stage, the reset compensation circuit 2 writes the first voltage to the second node N2 in response to the control of the reset control signal, and writes, according to the change of the voltage at the second node N2 and the threshold voltage, the light emission voltage capable of performing threshold compensation on the driving transistor DTFT to the first node N1.

In a light emission stage, the driving transistor DTFT generates a corresponding driving current according to the light emission voltage, and the light emission control circuit 3 connects the third node N3 to the first electrode of the light emitting device OLED in response to the control of the light emission control signal to provide the driving current to the light emitting device OLED.

It can be seen from the above that the pixel circuit provided by the embodiments of the present disclosure can use the voltage at the first electrode of the light emitting device OLED to reset the first node N1 (the gate of the driving transistor DTFT) when operating in the reset stage, which obviates the need to dispose an independent reset voltage input terminal for resetting the first node N1, thereby facilitating simplification of the circuit structure and reducing an overall size of the pixel circuit; meanwhile, the pixel circuit provided by the embodiments of the present disclosure can also effectively compensate for the threshold voltage of the driving transistor DTFT, thereby effectively improving the uniformity of OLED brightness in the display device.

In some embodiments, the reset compensation circuit 2 writes, according to the change of the voltage at the second node N2 and the threshold voltage, the light emission voltage V0 capable of performing threshold compensation on the driving transistor DTFT to the first node N1 in the light emission voltage generation stage, and the light emission voltage V0 satisfies: $V0=2*V1+Vth-Vdata$; where V0 is the light emission voltage, V1 is the first voltage, Vth is the threshold voltage of the driving transistor DTFT, and Vdata is the data voltage. Detailed description will be given below in conjunction with specific examples.

Figure 4:
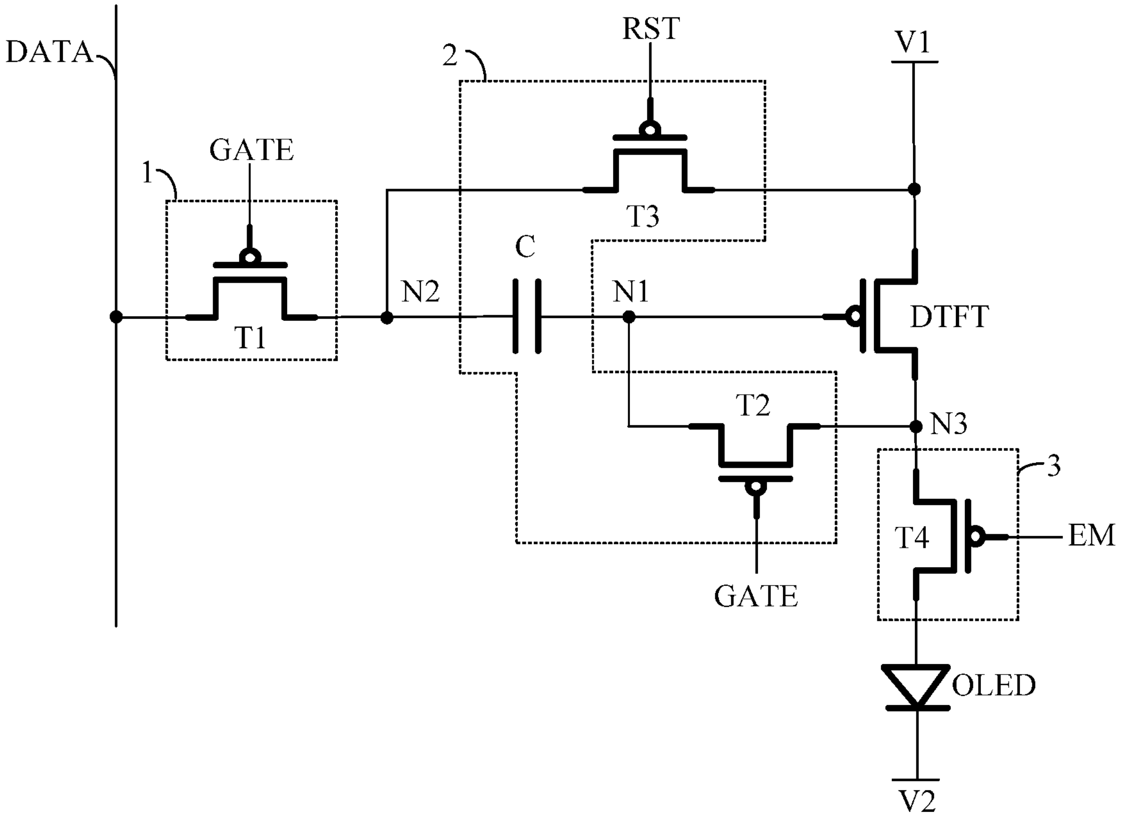
FIG. 4 is a schematic diagram of another circuit structure of a pixel circuit according to the embodiments of the present disclosure.

FIG. 4 is a schematic diagram of another circuit structure of a pixel circuit according to the embodiments of the present disclosure. As shown in FIG. 4, in some embodiments, the data writing circuit 1 includes: a first transistor T1. A control electrode of the first transistor T1 is connected to the gate line GATE, a first electrode of the first transistor T1 is connected to the data line DATA, and a second electrode of the first transistor T1 is connected to the second node N2.

In some embodiments, the reset compensation circuit 2 includes: a second transistor T2, a third transistor T3, and a capacitor C. A control electrode of the second transistor T2 is connected to the gate line GATE, a first electrode of the second transistor T2 is connected to the first node N1, and a second electrode of the second transistor T2 is connected to the third node N3. A control electrode of the third transistor T3 is connected to the reset control signal line RST, a first electrode of the third transistor T3 is connected to the second node N2, and a second electrode of the third transistor T3 is connected to the first voltage input terminal. A first terminal of the capacitor C is connected to the second node N2, and a second terminal of the capacitor C is connected to the first node N1.

In some embodiments, the light emission control circuit 3 includes: a fourth transistor T4. A control electrode of the fourth transistor T4 is connected to the light emission control signal line EM, a first electrode of the fourth transistor T4 is connected to the third node N3, and a second electrode of the fourth transistor T4 is connected to the first electrode of the light emitting device OLED. A second electrode of the light emitting device OLED is connected to a second voltage input terminal.

The operating process of the pixel circuit provided by the embodiments of the present disclosure will be described in detail below with reference to the drawings. It should be noted that a case where all transistors in the pixel circuit are P-type thin film transistors is merely an exemplary solution of the embodiments, but the technical solutions of the present disclosure are not limited thereto. In an embodiment, the driving transistor DTFT should be a P-type thin film transistor, and other transistors (the first transistor T1 to the fourth transistor T4 all serving as switching transistors) may be N-type thin film transistors. The first voltage input terminal provides the first voltage V1 and the second voltage input terminal provides the second voltage V2. In some embodiments, the first voltage is a high-level operating voltage Vdd, and the second voltage is a ground voltage Vss.

Figure 5:
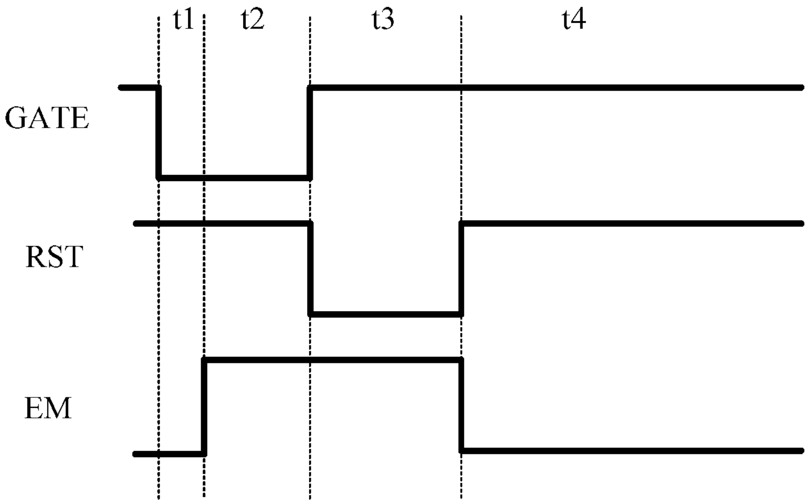
FIG. 5 is an operating sequence diagram of the pixel circuit shown in FIG. 4.

FIG. 5 is an operating sequence diagram of the pixel circuit shown in FIG. 4. As shown in FIG. 5, the operating process of the pixel circuit includes the following stages.

In the reset stage t1, the gate driving signal (also referred to as a scanning signal) provided by the gate line GATE is at a low level, the reset control signal provided by the reset control signal line RST is at a high level, and the light emission control signal provided by the light emission control signal line EM is at a low level. At this time, the first transistor T1, the second transistor T2, and the fourth transistor T4 are all turned on, and the third transistor T3 is turned off.

The driving transistor DTFT remains in an on state as in a previous cycle, at this time, a path is formed between the first voltage input terminal and the second voltage input terminal, the driving transistor DTFT and the light emitting device OLED are serially connected for voltage division, and under a condition that a resistance of the fourth transistor T4 is not considered, the voltage at the first electrode of the light emitting device OLED is approximately equal to (V1−V2)*R_OLED/(R_DTFT+R_OLED)+V2=(R_DTFT*V2+R_OLED*V1)/(R_DTFT+R_OLED), where R_DTFT is a resistance of the driving transistor DTFT in an on state, and R_OLED is a resistance of the light emitting device OLED in an on state.

It should be noted that values of the resistance R_DTFT and the resistance R_OLED in the on states may be influenced by factors such as a current in the circuit and durations of the on states, so that the voltage at the first electrode of the OLED is not a constant value (varying between 1V and 2V) in the reset stage t1.

Since the second transistor T2 is in an on state, the voltage at the first electrode of the light emitting device OLED can be written to the first node N1 through the fourth transistor T4, the third node N3 and the second transistor T2, so as to reset a voltage at the first node N1. It should be noted that although the voltage at the first electrode of the OLED is not a constant value in the reset stage t1, a value of the voltage at the first electrode of the OLED is always less than that of the first voltage V1, that is, after the first node N1 is reset, the voltage at the first node N1 is less than the first voltage V1, and the driving transistor DTFT is still kept in the on state.

Meanwhile, since the first transistor T1 is in an on state, the data voltage can be written to the second node N2 through the first transistor T1.

In the compensation stage t2, the gate driving signal provided by the gate line GATE is at a low level, the reset control signal provided by the reset control signal line RST is at a high level, and the light emission control signal provided by the light emission control signal line EM is at a high level. At this time, both the first transistor T1 and the second transistor T2 are turned on, and both the third transistor T3 and the fourth transistor T4 are turned off.

Since the fourth transistor T4 is in an off state, a current output from the driving transistor DTFT charges the first node N1 through the third node N3 and the second transistor T2, and thus the voltage at the first node N1 increases. The driving transistor DTFT is switched to an off state and the charging ends until the voltage at the first node N1 is equal to V1+Vth, and the reset compensation circuit 2 acquires the threshold voltage Vth of the driving transistor DTFT.

Meanwhile, since the first transistor T1 remains in the on state, a voltage at the second node N2 is kept to be equal to the data voltage. The first transistor T1 continuously writes the data voltage to the second node N2 in the reset stage and the compensation stage, so that writing time is relatively long, thereby ensuring accurate writing of the data voltage.

At the end of the compensation stage t2, the voltage at the first node N1 is equal to V1+Vth, the voltage at the second node N2 is equal to Vdata, and a voltage difference between the two terminals of the capacitor C is equal to Vdata−V1−Vth.

In the light emission voltage generation stage t3, the gate driving signal provided by the gate line GATE is at a high level, the reset control signal provided by the reset control signal line RST is at a low level, and the light emission control signal provided by the light emission control signal line EM is at a high level. At this time, the third transistor T3 is turned on, and the first transistor T1, the second transistor T2, and the fourth transistor T4 are all turned off.

The first voltage V1 is written to the second node N2 through the third transistor T3, and the voltage at the second node N2 is changed from Vdata in the previous stage to V1. Since the second transistor T2 is turned off, the first node N1 is in a floating state, and the voltage at the first node N1 changes with the change of the voltage at the second node N2 under the bootstrap action of the capacitor C, and is changed from V1+Vth in the previous stage to V1+Vth+(V1−Vdata), that is, the light emission voltage V0 satisfying V0=V1+Vth+(V1−Vdata)=2*V1+Vth−Vdata is written to the first node N1.

It should be noted that, in order to ensure that the driving transistor DTFT can be turned on by the light emission voltage, V1−Vdata should be less than 0, that is, V1<Vdata.

In the light emission stage t4, the gate driving signal provided by the gate line GATE is at a high level, the reset control signal provided by the reset control signal line RST is at a high level, and the light emission control signal provided by the light emission control signal line EM is at a low level. At this time, the fourth transistor T4 is turned on, and the first transistor T1, the second transistor T2, and the third transistor T3 are all turned off.

At this time, a gate-source voltage Vgs (a voltage difference between the gate and the source) of the driving transistor DTFT is equal to 2*V1+Vth−Vdata−V1=V1+Vth−Vdata.

According to a saturated driving current formula of the driving transistor DTFT, the following equation can be obtained:

$$I = K*(Vgs - Vth)^2 = K*(V1 + Vth - Vdata - Vth)^2 = K*(Vdata - V1)^2$$

where I is the driving current output by the driving transistor DTFT; and k is a constant value related to channel characteristics of the driving transistor DTFT.

It can be seen from the above that the driving current output by the driving transistor DTFT is independent of the threshold voltage of the driving transistor DTFT in the light emission stage t4, that is, threshold compensation on the driving transistor DTFT is realized, so that the problem of non-uniform brightness caused by the different threshold voltages of the driving transistors DTFT can be solved.

In addition, in the embodiment, the pixel circuit is a 5T1C circuit (including 5 transistors and 1 capacitor C), and the second transistor T2 configured to acquire the threshold voltage of the driving transistor DTFT and the fourth transistor T4 configured to control light emission of the light emitting device OLED can also serve to reset the first node N1 in the reset stage, which obviates the need to dispose an additional transistor and an additional reset voltage input terminal, thereby facilitating simplification of the circuit structure and reducing the overall size of the pixel circuit.

It can be seen from the above that the pixel circuit provided by the embodiments of the present disclosure can satisfy a requirement of a threshold compensation function with a small size, and thus is applicable to high PPI products.

Figure 6:
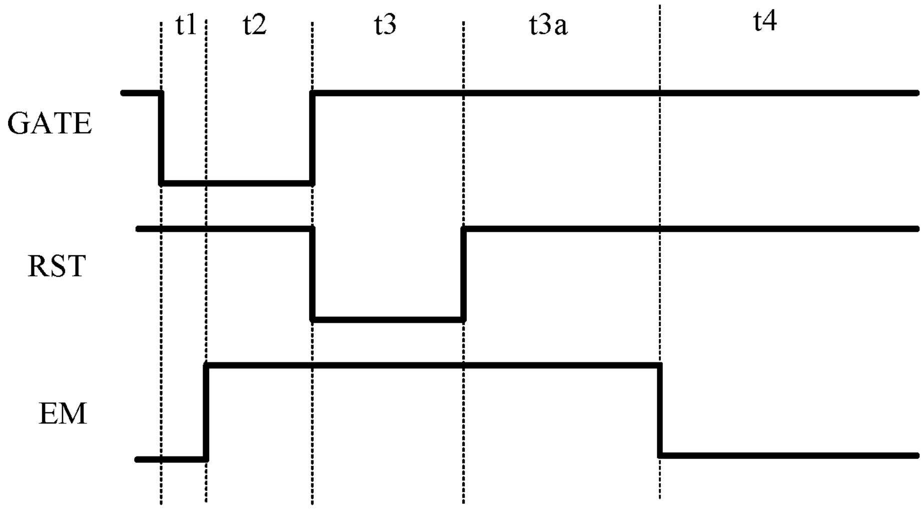
FIG. 6 is another operating sequence diagram of the pixel circuit shown in FIG. 4.

FIG. 6 is another operating sequence diagram of the pixel circuit shown in FIG. 4. As shown in FIG. 6, unlike the operating sequence shown in FIG. 5, the operating sequence shown in FIG. 6 further includes a charge maintenance stage t3*a* between the light emission voltage generation stage t3 and the light emission stage t4, and only the charge maintenance stage t3*a* will be described in detail below.

In the charge maintenance stage t3*a*, the gate driving signal provided by the gate line GATE is at a high level, the reset control signal provided by the reset control signal line RST is at a high level, and the light emission control signal provided by the light emission control signal line EM is at a high level. At this time, the first transistor, the second transistor, the third transistor, and the fourth transistor are all turned off.

Since the first transistor, the second transistor, the third transistor, and the fourth transistor are all turned off, the first node N1, the second node N2, and the third node N3 are all in floating states to maintain their respective voltages at the end of the light emission voltage generation stage.

In practical applications, for a whole display device, time of one frame is divided into a driving stage and a stable display stage, rows of pixel circuits sequentially drive light emitting devices OLED connected thereto in the driving stage (the reset stage t1, the compensation stage t2 and the light emission voltage generation stage t3 are carried out), and all light emitting devices OLED simultaneously emit light in the stable display stage (all pixel circuits simultaneously enter the light emission stage t4) to display an image. Except the last row of pixel circuits, each of the other rows of pixel circuits should wait to enter the light emission stage t4 until the light emission voltage generation stage of the last row of pixel circuits is completed. Therefore, except the last row of pixel circuits, the other rows of pixel circuits need to enter the charge maintenance stage t3*a* after the light emission voltage generation stage is completed, and then enter the light emission stage t4; and the last row of pixel circuits may directly enter the light emission stage t4 after completing the light emission voltage generation stage.

Table 1 below illustrates driving currents respectively output by the 3T1C pixel circuit shown in FIG. 1, the 5T1C pixel circuit shown in FIG. 4, and the 7T1C pixel circuit shown in FIG. 2 when simulating a condition where the threshold voltage of the driving transistor is constant and the data voltage varies.

TABLE 1

| Data voltage (V) | Threshold voltage (V) of driving transistor | Driving current (A) output by 3T1C circuit | Driving current (A) output by 5T1C circuit | Driving current (A) output by 7T1C circuit |
|---|---|---|---|---|
| 3 | 0 | 1.4E−08 | 5.4E−10 | 1.1E−07 |
| 4 | 0 | 1.2E−12 | 5.5E−10 | 7.2E−11 |
| 5 | 0 | 6.0E−13 | 2.6E−09 | −7.1E−12 |
| 6 | 0 | 7.7E−13 | 2.5E−07 | −6.5E−12 |

It can be seen from the simulation illustrated by Table 1 that for different data voltages, the 3T1C pixel circuit, the 5T1C pixel circuit and the 7T1C pixel circuit can all output different driving currents to achieve different gray scale display under the condition that the threshold voltage of the driving transistor maintains unchanged.

Table 2 below illustrates driving currents respectively output by the 3T1C pixel circuit shown in FIG. 1, the 5T1C pixel circuit shown in FIG. 4, and the 7T1C pixel circuit shown in FIG. 2 when simulating a condition where the data voltage is constant and the threshold voltage of the driving transistor varies.

TABLE 2

| Data voltage (V) | Threshold voltage (V) of driving transistor | Driving current (A) output by 3T1C circuit | Driving current (A) output by 5T1C circuit | Driving current (A) output by 7T1C circuit |
|---|---|---|---|---|
| 5 | −2 | 1.0E−12 | 3.1E−09 | −7.3E−12 |
| 5 | −1 | 7.0E−13 | 3.4E−09 | −6.8E−12 |
| 5 | 0 | 6.0E−13 | 2.6E−09 | −7.1E−12 |
| 5 | 1 | 1.2E−13 | 3.2E−09 | −6.5E−12 |

It can be seen from the simulation illustrated by Table 2 that, under the condition that the data voltage maintains unchanged and after the threshold voltage of the driving transistor varies, the driving current output by the 3T1C pixel circuit provided in the related art has a relatively large shift (between 1.2E-13 and 1.0E-12), while the driving current output by the 5T1C pixel circuit provided by the present disclosure has a relatively small shift (between 2.6E-09 and 3.4E-09), and the driving current output by the 7T1C pixel circuit provided in the related art also has a relatively small shift (between −6.5E-12 and −7.3E-12). Thus, the 5T1C pixel circuit provided by the embodiments of the present disclosure and the 7T1C pixel circuit provided in the related art can both effectively compensate for the threshold voltage of the driving transistor.

Figure 7:
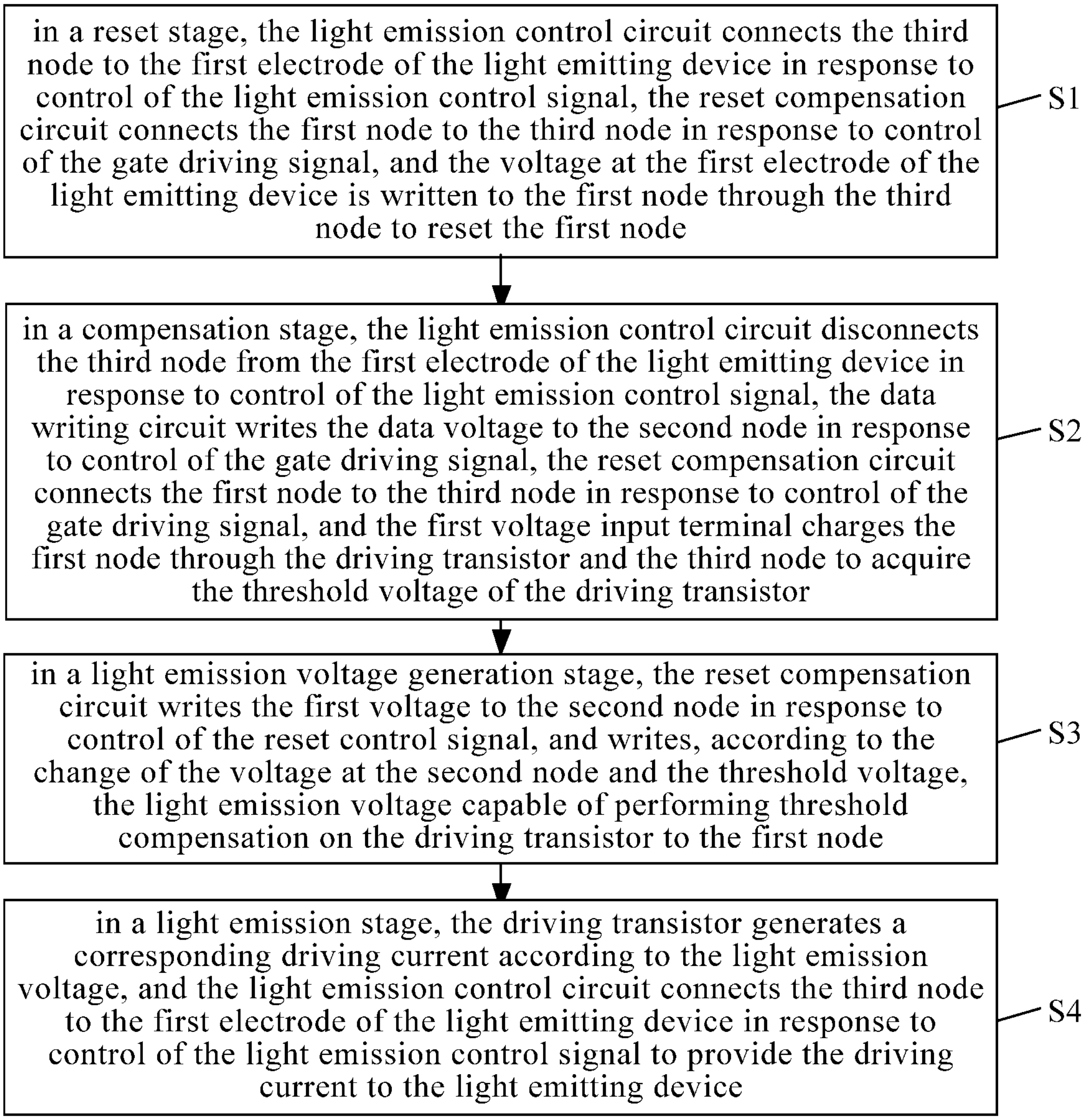
FIG. 7 is a flowchart illustrating a pixel driving method according to the embodiments of the present disclosure.

FIG. 7 is a flowchart illustrating a pixel driving method according to the embodiments of the present disclosure. As shown in FIG. 7, the pixel driving method is based on the pixel circuit provided by the above embodiments, and includes the following steps.

Step S1: in a reset stage, the light emission control circuit connects the third node to the first electrode of the light emitting device in response to control of the light emission control signal, the reset compensation circuit connects the first node to the third node in response to control of the gate driving signal, and the voltage at the first electrode of the light emitting device is written to the first node through the third node to reset the first node.

Step S2: in a compensation stage, the light emission control circuit disconnects the third node from the first electrode of the light emitting device in response to control of the light emission control signal, the data writing circuit writes the data voltage to the second node in response to control of the gate driving signal, the reset compensation circuit connects the first node to the third node in response to control of the gate driving signal, and the first voltage input terminal charges the first node through the driving transistor and the third node to acquire the threshold voltage of the driving transistor.

Step S3: in a light emission voltage generation stage, the reset compensation circuit writes the first voltage to the second node in response to control of the reset control signal, and writes, according to the change of the voltage at the second node and the threshold voltage, the light emission voltage capable of performing threshold compensation on the driving transistor to the first node.

Step S4: in a light emission stage, the driving transistor generates a corresponding driving current according to the light emission voltage, and the light emission control circuit connects the third node to the first electrode of the light emitting device in response to control of the light emission control signal to provide the driving current to the light emitting device.

In some embodiments, the pixel driving method further includes step S3*a* (not shown in FIG. 7) between the step S3 and the step S4.

The step S3*a*: in a charge maintenance stage, the reset compensation circuit disconnects the first voltage input terminal from the second node in response to control of the reset control signal.

Reference may be made to corresponding contents in the description of the above embodiments for detailed description of the above steps, which will not be repeated here.

The embodiments of the present disclosure further provide a display substrate, including: a pixel circuit, which adopts the pixel circuit provided by the above embodiments. Reference may be made to the contents in the description of the above embodiments for detailed description of the pixel circuit, which will not be repeated here.

The embodiments of the present disclosure further provide a display device, including: a display substrate, which adopts the display substrate described above. Reference may be made to the contents in the description of the above embodiments for detailed description of the display substrate, which will not be repeated here.

The display device provided by the embodiments of the present disclosure may be any product or component with a display function, such as electronic paper, an OLED panel, a mobile phone, a tablet computer, a television, a display, a notebook computer, a digital photo frame, or a navigator.

It could be understood that the above embodiments are merely exemplary embodiments adopted to illustrate the principle of the present disclosure, and the present disclosure is not limited thereto. Various modifications and improvements can be made by those of ordinary skill in the art without departing from the spirit and essence of the present disclosure, and those modifications and improvements are also considered to fall within the protection scope of the present disclosure.

What is claimed is:

1. A method of driving a display device, wherein the display device comprises a display substrate, the display substrate comprises a plurality of rows of pixel circuits, and each pixel circuit comprises: a data writing circuit, a reset compensation circuit, a light emission control circuit and a driving transistor, wherein the reset compensation circuit and a gate of the driving transistor are connected at a first node, the reset compensation circuit and the data writing circuit are connected at a second node, and the reset compensation circuit, a second electrode of the driving transistor and the light emission control circuit are connected at a third node; the data writing circuit is connected to a gate line and a data line; the light emission control circuit is connected to a light emission control signal line and a first electrode of a light emitting device; the reset compensation circuit is connected to the gate line, a reset control signal line and a first voltage input terminal; and a first electrode of the driving transistor is connected to the first voltage input terminal;

wherein time of one frame is divided into a driving stage and a stable display stage;

in the driving stage, the rows of pixel circuits sequentially drive light emitting devices OLED connected thereto, wherein driving a light emitting device OLED connected to any one pixel circuit comprises at least a reset stage, a compensation stage and a light emission voltage generation stage, and driving a light emitting device OLED connected to each of other rows of pixel circuits except a last row of pixel circuits further comprises a charge maintenance stage performed after the light emission voltage generation stage; and in the stable display stage, all light emitting devices OLED simultaneously emit light;

wherein in the reset stage, the third node is connected to the first electrode of the light emitting device by the light emission control circuit in response to control of a light emission control signal provided by the light emission control signal line, the first node is connected to the third node by the reset compensation circuit in response to control of a gate driving signal provided by the gate line, and the voltage at the first electrode of the light emitting device is written to the first node through the third node to reset the first node;

in the compensation stage, the third node is disconnected from the first electrode of the light emitting device by the light emission control circuit in response to control of the light emission control signal, the data voltage is written to the second node by the data writing circuit in response to control of the gate driving signal, the first node is connected to the third node by the reset compensation circuit in response to control of the gate driving signal, and the first node is charged by the first voltage input terminal through the driving transistor and the third node to acquire the threshold voltage of the driving transistor;

in the light emission voltage generation stage, a first voltage provided by the first voltage input terminal is written to the second node in response to control of the reset control signal, and the light emission voltage capable of performing threshold compensation on the driving transistor is written, according to the change of the voltage at the second node and the threshold voltage, to the first node by the reset compensation circuit;

in the charge maintenance stage, the first voltage input terminal is disconnected from the second node by the reset compensation circuit in response to control of the reset control signal; and in the light emission stage, a corresponding driving current is generated by the driving transistor according to the light emission voltage, and the third node is connected to the first electrode of the light emitting device by the light emission control circuit in response to control of the light emission control signal to provide the driving current to the light emitting device.

2. The method of claim 1, wherein the light emission voltage satisfies:

$$V0=2*V1+Vth-\mathrm{Vdata}$$

where V0 is the light emission voltage, V1 is the first voltage, Vth is the threshold voltage of the driving transistor, and Vdata is the data voltage.

3. The method of claim 1, wherein the data writing circuit comprises: a first transistor; and a control electrode of the first transistor is connected to the gate line, a first electrode of the first transistor is connected to the data line, and a second electrode of the first transistor is connected to the second node.

4. The method of claim 1, wherein the reset compensation circuit comprises: a second transistor, a third transistor, and a capacitor;

a control electrode of the second transistor is connected to the gate line, a first electrode of the second transistor is connected to the first node, and a second electrode of the second transistor is connected to the third node;

a control electrode of the third transistor is connected to the reset control signal line, a first electrode of the third transistor is connected to the second node, and a second electrode of the third transistor is connected to the first voltage input terminal; and a first terminal of the capacitor is connected to the second node, and a second terminal of the capacitor is connected to the first node.

5. The method of claim 1, wherein the light emission control circuit comprises: a fourth transistor; and a control electrode of the fourth transistor is connected to the light emission control signal line, a first electrode of the fourth transistor is connected to the third node, and a second electrode of the fourth transistor is connected to the first electrode of the light emitting device.

6. The method of claim 1, wherein all transistors in the pixel circuit are P-type transistors.

* * * * *